(12) United States Patent
Dai et al.

(10) Patent No.: US 9,986,606 B2
(45) Date of Patent: May 29, 2018

(54) VOLTAGE ADAPTABLE DRIVING SIGNAL CONVERTER

(71) Applicant: GUANGZHOU RISING DRAGON ELECTRONICS & PLASTICS TECHNOLOGY CO., LTD., Guangzhou (CN)

(72) Inventors: Zhongguo Dai, Guangzhou (CN); Ziqin Guo, Guangzhou (CN)

(73) Assignee: GUANGZHOU RISING DRAGON ELECTRONICS & PLASTICS TECHNOLOGY CO., LTD., Guangzhou, Guangdong (CN)

( * ) Notice: Subject to any disclaimer, the term of this patent is extended or adjusted under 35 U.S.C. 154(b) by 0 days. days.

(21) Appl. No.: 15/402,991

(22) Filed: Jan. 10, 2017

(65) Prior Publication Data

US 2017/0223789 A1 Aug. 3, 2017

(30) Foreign Application Priority Data

Feb. 3, 2016 (CN) .......................... 2016 1 0076864

(51) Int. Cl.
*H05B 37/02* (2006.01)
*H05B 33/08* (2006.01)

(52) U.S. Cl.
CPC ....... *H05B 33/0815* (2013.01); *H05B 33/086* (2013.01); *H05B 37/0254* (2013.01)

(58) Field of Classification Search
CPC ....................... H05B 33/0815; H05B 33/0845; H05B 37/02; H05B 37/0254; H05B 33/086; H02M 1/36
(Continued)

(56) References Cited

U.S. PATENT DOCUMENTS 8,022,683 B2 * 9/2011 Thompson ............ H02M 3/158
323/284
9,155,174 B2 * 10/2015 Draper ............... H05B 41/3924
(Continued)

FOREIGN PATENT DOCUMENTS

CN 102239742 A 11/2011
CN 103841696 A 6/2014
(Continued)

OTHER PUBLICATIONS

International Search Report for International Application No. PCT/CN2016/097639 dated Nov. 30, 2016.

*Primary Examiner* — Don Le
(74) *Attorney, Agent, or Firm* — Dorsey & Whitney LLP

(57) ABSTRACT

A voltage adaptable driving signal converter is disclosed, including a rectifying device, a pre-stage energy storing device, a DC-DC conversion device, a post-stage energy storing device, a control conversion device and a switch control device. The rectifying device, the pre-stage energy storing device, the DC-DC conversion device and the post-stage energy storing device are sequentially connected. The pre-stage energy storing device is coupled to a positive electrode of a power supply or to a grounding electrode. The post-stage energy storing device is coupled to and adapted to supply electrical power to a load to be driven. The control conversion device is coupled to the control line and the switch control device respectively. The switch control device is coupled to the post-stage energy storing device and the load respectively. With the above voltage adaptable driving signal, a low-voltage load can be driven by a high-voltage control signal, and a high-voltage load can be driven by a low-voltage control signal, or a load which is not convenient to be made into a high-voltage load can incorporate the voltage adaptable driving signal converter to (Continued)

become a high-voltage load, to achieve the matching between the switch control signal and the load.

9 Claims, 2 Drawing Sheets

(58) Field of Classification Search
USPC .................................................. 315/291, 201
See application file for complete search history.

(56) References Cited

U.S. PATENT DOCUMENTS

| | | | |
|---|---|---|---|
| 9,271,345 B2 | 2/2016 | Welten | |
| 2007/0146565 A1* | 6/2007 | Jeon | G02F 1/133603 349/42 |
| 2010/0144537 A1 | 6/2010 | Kawashima | |
| 2011/0309759 A1* | 12/2011 | Shteynberg | H05B 33/0815 315/201 |
| 2012/0062133 A1* | 3/2012 | Cubias | H05B 33/0809 315/201 |
| 2012/0112657 A1* | 5/2012 | Van Der Veen | H02M 1/4225 315/291 |
| 2012/0187863 A1* | 7/2012 | Nonaka | H05B 33/0815 315/291 |
| 2012/0212143 A1* | 8/2012 | Esaki | H05B 33/089 315/192 |
| 2013/0038227 A1* | 2/2013 | Yan | H05B 33/0818 315/186 |
| 2014/0062333 A1* | 3/2014 | Sonobe | H05B 33/0815 315/291 |
| 2014/0253032 A1* | 9/2014 | Bruwer | H02M 1/36 320/108 |
| 2014/0265935 A1* | 9/2014 | Sadwick | H05B 33/0815 315/307 |
| 2015/0180355 A1* | 6/2015 | Freeman | H02M 1/08 363/21.04 |
| 2017/0223789 A1 | 8/2017 | Dai et al. | |

FOREIGN PATENT DOCUMENTS

| | | |
|---|---|---|
| CN | 104167941 A | 11/2014 |
| CN | 104219835 A | 12/2014 |
| CN | 104660027 A | 5/2015 |
| CN | 104682741 A | 6/2015 |
| CN | 104684193 A | 6/2015 |
| CN | 204539544 U | 8/2015 |
| CN | 105517263 A | 4/2016 |
| CN | 205648130 U | 10/2016 |
| WO | WO2001076324 | 10/2011 |
| WO | WO2017133236 | 8/2017 |

* cited by examiner

VOLTAGE ADAPTABLE DRIVING SIGNAL CONVERTER

FIELD

The present disclosure relates generally to the technical field of power electronics, and specifically to a voltage adaptable driving signal converter.

BACKGROUND

The voltage converter has been widely used in power systems of electronic devices. Take a voltage converter used in a four-wire RGB lighting control system with driving capability, for example. Compared with a traditional lighting control system, the four-wire RGB lighting control system with driving capability saves a V+ wire or a GND wire, so it does not have a stable electricity output. The four-wire RGB lighting control system not only cannot have the same effect as the traditional lighting control system in voltage conversion, but also requires that the control signal output from the system should match the load, for example, a control signal with 12 V must match a load with 12 V and cannot be used to control a load with 5 V or 24 V. Similarly, a control signal with 5 V must match a load with 5 V, and a control signal with 24 V must match a load with 24 V. When a load not matching the control signal has to be used, the matched resistance should be increased to increase the consumed power, which results in waste of electricity.

SUMMARY

Based on this, it is an objective of the present disclosure to provide a voltage adaptable driving signal converter, to address the problem that a given control signal cannot match different loads and can only control a load with a certain voltage. The voltage adaptable driving signal converter presented in the disclosure is a device designed specifically to match different loads of respective voltages. With the device, a load with a relative lower voltage level can be driven by a control signal with a relative higher voltage level, and a load with a relative higher voltage level can be driven by a control signal with a relative lower voltage level, to improve the matching between the control signal and the load.

According to the objective of the present disclosure, a voltage adaptable driving signal converter is provided, including a rectifying device, a pre-stage energy storing device, a DC-DC conversion device, a post-stage energy storing device, a control conversion device and a switch control device, wherein the rectifying device, the pre-stage energy storing device, the DC-DC conversion device and the post-stage energy storing device are sequentially connected, the rectifying device is adapted to receive a switch control signal input from a control system through a control line, convert the switch control signal into a smooth direct current electrical signal, and output the smooth direct current electrical signal to the pre-stage energy storing device, the pre-stage energy storing device is coupled to a positive electrode of a power supply or to a grounding electrode, and the post-stage energy storing device is coupled to and adapted to supply electrical power to a load to be driven, wherein the control conversion device is coupled to the control line and the switch control device respectively, and the control conversion device is adapted to receive the switch control signal through the control line, convert the switch control signal into a reference voltage, and output the reference voltage to the switch control device, and wherein the switch control device is coupled to the post-stage energy storing device and the load respectively.

The above voltage adaptable driving signal converter is a device designed specifically to match different loads of respective voltages, which is able to efficiently transform the amplitude of the switch control signal traversing on a control line while not changing the duty ratio of the switch control signal. In addition, since the switch control signal traversing on the control line is not a direct current signal, when there are more control lines, that is, when there are more switch control signals input, and there is a higher frequency in the switch control signal, the direct current signal generated through rectifying and filtering by the rectifying device is more stable, and the operating state of the voltage adaptable driving signal converter is also more stable. With the voltage adaptable driving signal converter presented in the disclosure, a load with a relative lower voltage level can be driven by a control signal with a relative higher voltage level, and a load with a relative higher voltage level can be driven by a control signal with a relative lower voltage level, or a load which is not convenient to be made into a load with a relative higher voltage level can incorporate the voltage adaptable driving signal converter to become a load with a relative higher voltage level, to achieve the matching between the switch control signal and the load. Moreover, the voltage adaptable driving signal converter presented in the disclosure is adaptable for a high-voltage input, so it can take full advantage of the long transmission distance of a high voltage level.

DETAILED DESCRIPTION OF THE PREFERRED EMBODIMENTS

In the following description of embodiments, reference is made to the accompanying drawings which form a part hereof, and in which it is shown by way of illustration specific embodiments of the disclosure that can be practiced. It is to be understood that other embodiments can be used and structural changes can be made without departing from the scope of the disclosed embodiments.

Figure 1:
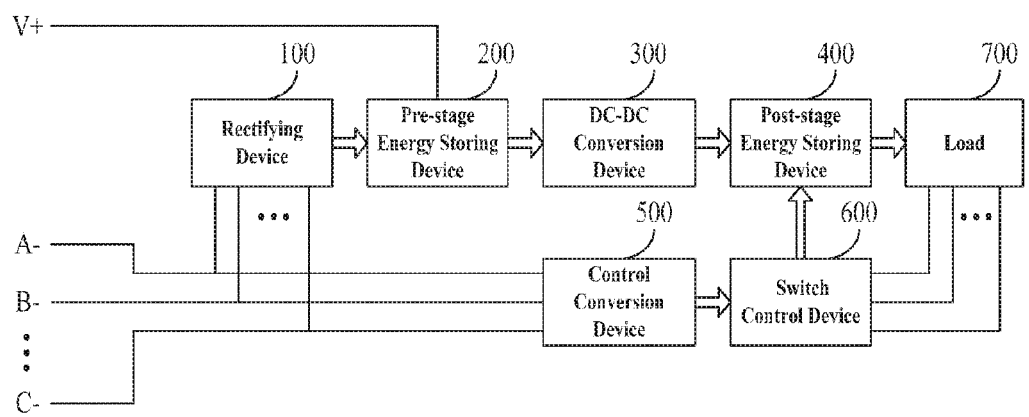
FIG. 1 is a structural schematic diagram illuminating a voltage adaptable driving signal converter in a case of a common anode according to one embodiment of the present disclosure.
Figure 2:
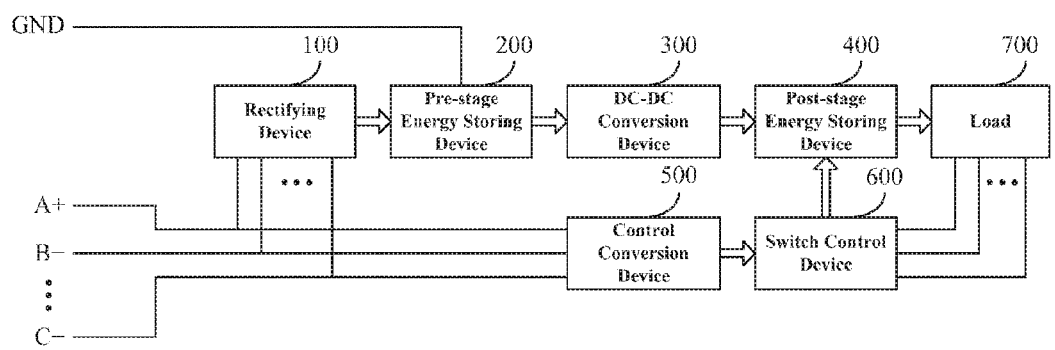
FIG. 2 is a structural schematic diagram illuminating a voltage adaptable driving signal converter in a case of a common cathode according to one embodiment of the present disclosure.

In one embodiment, as shown in FIG. 1, a voltage adaptable driving signal converter is provided, including a rectifying device 100, a pre-stage energy storing device 200, a DC-DC conversion device 300, a post-stage energy storing device 400, a control conversion device 500 and a switch control device 600.

The rectifying device 100, the pre-stage energy storing device 200, the DC-DC conversion device 300 and the post-stage energy storing device 400 are sequentially connected. The rectifying device 100 is coupled to a control line A-, a control line B- and a control line C- respectively, and adapted to receive a switch control signal input from a control system through the control line A-, B- and C-, convert the switch control signal into a smooth direct current electrical signal, and output the smooth direct current electrical signal to the pre-stage energy storing device 200. The pre-stage energy storing device 200 is coupled to a positive electrode of a power supply for supplying electrical power. The post-stage energy storing device 400 is coupled to and adapted to supply electrical power to a load 700 to be driven.

The control conversion device 500 is coupled to the control lines A-, B- and C- and the switch control device respectively. The control conversion device 500 is adapted to receive the switch control signal through the control lines A-, B- and C-, convert the switch control signal into a reference voltage required by the switch control device 600, and output the reference voltage to the switch control device 600.

The switch control device 600 is coupled to the post-stage energy storing device 400 and the load 700.

In this embodiment, the rectifying device is form by semiconductor elements such as diode, triode or MOS transistor. The switch control signal transmitted by the control lines A-, B- and C- from the control system is generally not a stable direct current electrical signal, which may be processed through rectifying and filtering by the rectifying device 100 to become a smooth direct current electrical signal. The rectifying and filtering through the rectifying device 100 do not affect the frequency and duty ratio of the original switch control signal. Since the switch control signal input from the rectifying device 100 to the pre-stage energy storing device may be not a continuous signal, in order to prevent the DC-DC conversion device 300 from being damaged caused by frequent outages, energy storing elements used in the pre-stage energy storing device 200 have better performance than elements used for filtering simply, and the pre-stage energy storing device 200 further provides a return circuit for the control conversion device 500 and the switch control device 600, such that the pre-stage energy storing device 200 is used to make the control conversion and switch control form a loop and complete the conversion. In order to further improve the conversion efficiency of the voltage adaptable driving signal converter, a DC-DC conversion device with high conversion efficiency is used in this embodiment for voltage conversion, rather than a linear voltage converter. The DC-DC conversion device 300 may convert the DC voltage processed by rectifying and filtering into a voltage matching the load 700, to supply electrical power to the load 700 through the post-stage energy storing device 400. The type of the DC-DC conversion device 300 may be chosen as required, such that the voltage adaptable driving signal converter presented in the disclosure may become a buck-mode voltage adaptable driving signal converter or a boost-mode voltage adaptable driving signal converter. In this way, a load with a relative lower voltage level can be driven by a control signal with a relative higher voltage level, and a load with a relative higher voltage level can be driven by a control signal with a relative lower voltage level. The switch control signal processed though the buck or boost by the DC-DC conversion device may be input to the post-stage energy storing device 400. In order to ensure there is no delay on the load 700 when the input switch control signal is changed, energy storing elements used in the post-stage energy storing device 400 have better performance than elements used for filtering simply. Taking a case of a common anode as shown in FIG. 1 for example, since the input switch control signal does not have a stable GND or V+, a virtual GND is formed through rectifying and filtering by the rectifying device 100 made up of semiconductor elements. The virtual GND is stable with respect to the output voltage of the DC-DC conversion device 300 and the switch control device, but is not stable with respect to V+. In this case, the voltage difference between the switch control signal and V+ is stable, and the voltage difference between the switch control signal and the virtual GND is not stable. The signal required by the switch control device 600 should form a stable voltage difference with the virtual GND, and in this regard, the stable voltage difference between the switch control signal and V+ should be converted into a relatively stable between the switch control signal and the virtual GND, so a control conversion device 500 is incorporated. The control conversion device 500 may be implemented by an available technology, for example, a control conversion device formed by semiconductor elements such as diode or triode, to provide a stable reference voltage for switch control for the switch control device 600. The configuration and operating principle of the voltage adaptable driving signal converter presented in the present invention are explained in detail with reference to the case of a common anode as shown in FIG. 1, but it should be understood that the voltage adaptable driving signal converter applies to a case of a common cathode in which the pre-stage energy storing device 200 is coupled to a grounding electrode GND, and the control lines coupled to the rectifying device 100 and the control conversion device 500 include a control line A+, a control line B+ and a control line C+.

The above voltage adaptable driving signal converter in the embodiment is a device designed specifically to match different loads of respective voltages, which is able to efficiently transform the amplitude of the switch control signal traversing on a control line while not changing the duty ratio of the switch control signal. In addition, since the switch control signal traversing on the control line is not a direct current signal, when there are more control lines, that is, when there are more switch control signals input, and there is a higher frequency in the switch control signal, the direct current signal generated through rectifying and filtering by the rectifying device is more stable, and the operating state of the voltage adaptable driving signal converter is also more stable. With the voltage adaptable driving signal converter presented in the disclosure, a load with a relative lower voltage level can be driven by a control signal with a relative higher voltage level, and a load with a relative higher voltage level can be driven by a control signal with a relative lower voltage level, or a load which is not convenient to be made into a load with a relative higher voltage level can incorporate the voltage adaptable driving signal converter to become a load with a relative higher voltage level, to achieve the matching between the switch control signal and the load. Moreover, the voltage adaptable driving signal converter presented in the disclosure is adaptable for a high-voltage input, so it can take full advantage of the long transmission distance of a high voltage level.

As a specific implementation, there may be two or more control lines coupled to the rectifying device and the control conversion device. Since the switch control signal traversing on the control line is not a direct current electrical signal, in order to generate a relatively stable direct current electrical signal through rectifying and filtering by the rectifying device, there are two or more control lines in this embodiment. On one hand, it is beneficial to improve the stability of the voltage adaptable driving signal converter. On the other hand, the increment of the control lines enables a same voltage adaptable driving signal converter to perform switch control of more loads, thereby enhancing the efficiency of control.

As a specific implementation, the control system is a four-wire RGB lighting control system with driving capability, and the control lines include a R control line, a G control line and a B control line. The so-called four-wire RGB lighting control system with driving capability means V+ or GND combined with the R, G and B control lines with driving capability, and the R, G and B control lines are adapted to transmit switch control signal to control the voltage conversion. The voltage adaptable driving signal converter presented in the disclosure can apply to the four-wire RGB lighting control system with driving capability, but it should be understood that the application is not limited to the lighting control system. Compared with a traditional lighting control system, the four-wire RGB lighting control system with driving capability saves a V+ wire or a GND wire, and the control of the LED lamp can be effectively implemented by applying the voltage adaptable driving signal converter presented in the disclosure to the four-wire RGB lighting control system with driving capability, to address the difficulty of voltage conversion in the traditional technology due to there is no stable voltage output in the four-wire RGB lighting control system with driving capability.

As a specific implementation, the switch control signal is in a form of pulsating direct current. For a normal direct current, both of the value and the polarity of the voltage cannot change over time. For the pulsating direct current, the polarity of the voltage cannot change over time, but the value of the voltage can change over time. The pulsating direct current can become a smooth direct current only through filtering.

As a specific implementation, the DC-DC conversion device includes a sampling resistor. In this embodiment, the DC-DC conversion device includes a sampling resistor, so the output voltage of the DC-DC conversion device can be changed by the adjustment of the resistance of the sampling resistor. In this way, the amplitude of the voltage of the switch control signal can be changed without changing the duty ratio and frequency of the switch control signal, to improve the conversion efficiency of the voltage adaptable driving signal converter effectively.

Figure 3:
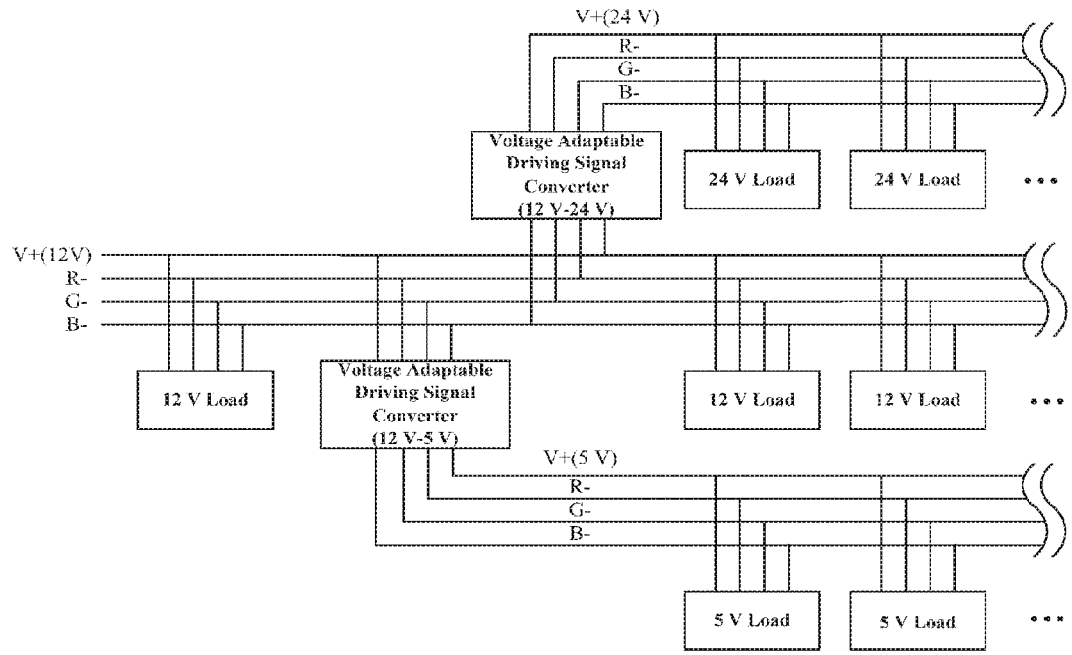
FIG. 3 is a schematic diagram showing a common-anode four-wire RGB lighting control system driving a plurality of loads after a four-wire to four-wire conversion.
Figure 4:
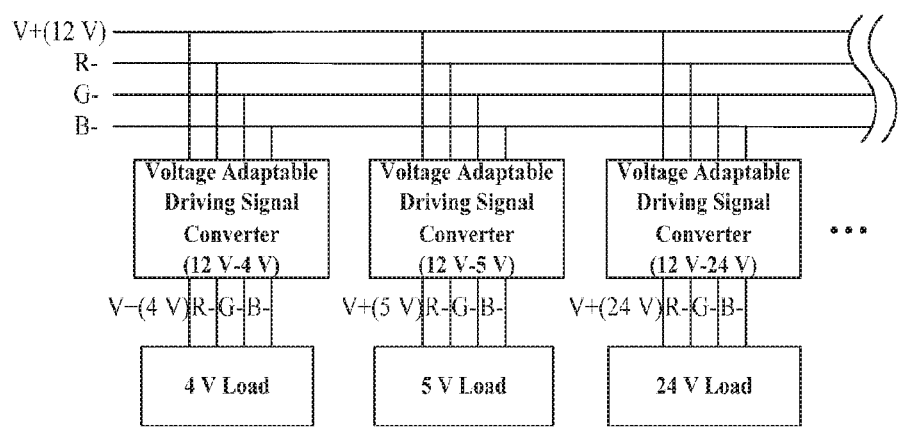
FIG. 4 is a schematic diagram showing a common-anode four-wire RGB lighting control system driving a plurality of loads with respective voltage adaptable driving signal converters.

As a specific implementation, the post-stage energy storing device is coupled to at least one load. The specific amount of the loads to be driven depends on the output power and efficiency of the DC-DC conversion device. Take a 12 V common-anode four-wire RGB lighting control system, for example. FIG. 3 is a schematic diagram showing a common-anode four-wire RGB lighting control system driving a plurality of loads after a four-wire to four-wire conversion. As shown in FIG. 3, the anode input of the four-wire RGB lighting control system is 12 V, and the voltage adaptable driving signal converter can drive a 5 V load, a 12 V load and a 24 V load after the four-wire to four-wire conversion, that is, the driving of loads with different voltages can be implemented by incorporating the voltage adaptable driving signal converter into the four-wire RGB lighting control system, and the number of the loads driven by the four-wire RGB lighting control system incorporating with the voltage adaptable driving signal converter can be from one to a maximum amount N. The maximum amount N depends on the output power and the efficiency of the DC-DC conversion device. Meanwhile the load driving ability of the 12 V four-wire RGB lighting control system may also have some effect on the maximum amount N. In addition to the above case of 12 V common-anode four-wire RGB lighting control system driving a plurality of loads after a four-wire to four-wire conversion, there is a case of a common-anode four-wire RGB lighting control system driving a plurality of loads with respective voltage adaptable driving signal converters as shown in FIG. 4. In the case as shown in FIG. 4, each load is incorporated with one voltage adaptable driving signal converter, to implement the driving of the 5 V load, the 12 V load and the 24 V load, that is, the matching of loads with different voltages can be implemented by incorporating the voltage adaptable driving signal converter into the four-wire RGB lighting control system. In this way, the maximum amount of the loads driven by the four-wire RGB lighting control system depends on the load driving ability of the 12 V common-anode four-wire RGB lighting control system and the power of the loads.

As a specific implementation, the DC-DC conversion device is a switch power supply. When the voltage of the switch control signal transmitted by the control line is too high, the switch power supply can be used to convert the input voltage into a DC Voltage with high quality, to meet the requirements of the voltage adaptable driving signal converter on the efficiency and stability of the output voltage.

As a specific implementation, the voltage adaptable driving signal converter further includes an insulating element connected between the control conversion device and the switch control device. The insulating element is adapted to electrically isolate the control conversion device from the switch control device, to improve the stability of the voltage adaptable driving signal converter. As an optional implementation, an optical coupler may be used as the insulating element. The optical coupler is also known as an optoelectronic isolator, which can provide a good electrical isolation between the input end and the output end, with strong anti-interference capacity, good stability, long service life and high transmission efficiency. The good electrical isolation between the control conversion device and the switch control device can be implemented by connecting the optical coupler therebetween as the insulating element, to further improve the stability of the voltage adaptable driving signal converter.

As a specific implementation, the rectifying device, the pre-stage energy storing device, the DC-DC conversion device, the post-stage energy storing device, the control conversion device and the switch control device are integrated in a printed circuit board. In the voltage adaptable driving signal converter presented in the present disclosure, the included rectifying device, pre-stage energy storing device, DC-DC conversion device, post-stage energy storing device, control conversion device and switch control device may be arranged on separate printed circuit boards (PCBs) respectively and the PCBs are connected together through electric wires to enable the function of the voltage adaptable driving signal converter. Alternatively, the rectifying device, the pre-stage energy storing device, the DC-DC conversion device, the post-stage energy storing device, the control conversion device and the switch control device may be integrated in one single printed circuit board, so that various devices are integrated as a whole, to simplify the structure of the voltage adaptable driving signal converter, reduce the volume of the voltage adaptable driving signal converter, and lower the cost of the voltage adaptable driving signal converter. In addition, the loads may be also integrated in the single printed circuit board together with the various devices of the voltage adaptable driving signal converter.

Technical features of the above embodiments may be combined arbitrarily. For brief description, not all of the possible combinations of the technical features of the above embodiments are described, but it will be appreciated that these possible combinations belong to the scope of the present disclosure once there is no conflict between the technical features.

The above are embodiments of the present disclosure described in detail, and should not be deemed as limitations to the scope of the present disclosure. It should be noted that variations and improvements will become apparent to those skilled in the art to which the present disclosure pertains without departing from its spirit and scope. Therefore, the scope of the present disclosure is defined by the appended claims.

The invention claimed is:

1. A voltage adaptable driving signal converter, comprising a rectifying device, a pre-stage energy storing device, a DC-DC conversion device, a post-stage energy storing device, a control conversion device and a switch control device, wherein the rectifying device, the pre-stage energy storing device, the DC-DC conversion device and the post-stage energy storing device are sequentially connected, the rectifying device is adapted to receive a pulse width modulated switch control signal input from a control system through a control line, convert the switch control signal into a smooth direct current electrical signal, and output the smooth direct current electrical signal to the pre-stage energy storing device, the pre-stage energy storing device is coupled to a positive electrode of a power supply or to a grounding electrode, the post-stage energy storing device is coupled to and adapted to supply electrical power to a driving device coupled to at least one load to be driven, and the DC-DC conversion device is adapted to reduce or raise a voltage of the direct current electrical signal, wherein the control conversion device is coupled to the control line and the switch control device respectively, and the control conversion device is adapted to receive the switch control signal through the control line, convert the switch control signal into a reference voltage, and output the reference voltage to the switch control device, and wherein the switch control device is coupled to the post-stage energy storing device and the driving device respectively.

2. The voltage adaptable driving signal converter of claim 1, wherein there are two or more control lines.

3. The voltage adaptable driving signal converter of claim 1, wherein the control system is a four-wire RGB lighting control system with driving capability, and the control line includes a R control line, a G control line and a B control line.

4. The voltage adaptable driving signal converter of claim 1, wherein the switch control signal is a pulsating direct current signal.

5. The voltage adaptable driving signal converter of claim 1, wherein the DC-DC conversion device includes a sampling resistor.

6. The voltage adaptable driving signal converter of claim 1, wherein the DC-DC conversion device is a switch power supply.

7. The voltage adaptable driving signal converter of claim 1, further comprising an insulating element connected between the control conversion device and the switch control device.

8. The voltage adaptable driving signal converter of claim 7, wherein the insulating element is an optical coupler.

9. The voltage adaptable driving signal converter of claim 1, the rectifying device, the pre-stage energy storing device, the DC-DC conversion device, the post-stage energy storing device, the control conversion device and the switch control device are integrated in a printed circuit board.

* * * * *